United States Patent [19]
Uyeda et al.

[11] 3,712,714
[45] Jan. 23, 1973

[54] INFORMATION DISPLAY FOR DIVER'S FACE MASK

[76] Inventors: Leon R. Uyeda, 7231 Emerson Avenue, Westminster, Calif. 92683; Jerry A. Emery, 17331 Elsinore Circle, Huntington Beach, Calif. 92647

[22] Filed: June 15, 1971

[21] Appl. No.: 153,365

[52] U.S. Cl. ..................350/301, 351/43, 351/158, 2/14 W
[51] Int. Cl. .............................................G02b 5/08
[58] Field of Search ........351/43, 158; 350/301, 298, 350/288; 2/14 W

[56] References Cited

UNITED STATES PATENTS 2,909,959  10/1959  Girden ................................350/301
296,388  4/1884  Choate et al....................351/46 U X

FOREIGN PATENTS OR APPLICATIONS 241,921  6/1926  Great Britain......................350/298

*Primary Examiner*—David Schonberg
*Assistant Examiner*—Michael J. Tokar
*Attorney*—Fulwider, Patton, Rieber, Lee & Utecht

[57] ABSTRACT

An information display means as a part of or for attachment to a diver's face mask, and including diver status indicators such as a clock, compass, air pressure gauge or the like, located out of the diver's usual line of sight, and further including reflecting surfaces, one of which is offset from such usual line of sight but encompassed by the diver's field of vision so that an optical path is provided from such reflecting portion to the status indicators, enabling the diver to selectively view his surroundings or the reflected image of the status indicators.

4 Claims, 3 Drawing Figures

PATENTED JAN 23 1973

3,712,714

INVENTORS.
LEON R. UYEDA
JERRY A. EMERY
BY Fulwider, Patton, Rieber,
Lee and Utecht
ATTORNEYS

INFORMATION DISPLAY FOR DIVER'S FACE MASK

BACKGROUND OF THE INVENTION

1. Field of the Invention

The present invention relates to an information display for a diver's face mask, and particularly to an information display located out of the diver's usual line of sight, but visible as a reflected image in a reflecting surface located out of such line of sight but encompassed by the diver's field of vision.

2. Description of the Prior Art

It is frequently important for a swimmer or diver to be able to quickly apprise himself of the status of his equipment or surroundings. Depending upon the nature of the dive, he may need information respecting his depth, the water temperature, the compass heading he is following, the elapsed time of the dive, or the air supply tank pressure.

Heretofore, SCUBA (self-contained underwater breathing apparatus) divers used separate indicators strapped or otherwise attached to their person to give these status indications. It is common practice for such a diver to have a clock and pressure gauge strapped to his wrist, a tank pressure indicator clipped to his waist or hanging free from his tank, and perhaps a compass on a separate strap on his wrist. Various other status indicators could also be used, such as a light meter for underwater photography, or a thermometer for determining the location of the thermocline, etc. There is at present no means known to applicants whereby these various status indicators can be carried by the diver in such a way that he can quickly scan such indicators without either having to fumble about to locate the indicator, or making a radical change in his visual field of interest to look at the indicator. The diver is already so encumbered by straps, fittings, and attachments for his air tank back pack, life vest, weight belt, and wet suit that the attachment of additional indicator equipment has proved to be awkward, cumbersome, unwieldy, and a distraction from his primary diving mission.

Applicants call attention to the following United States Letters Patents known to them:

| | |
|---|---|
| 1,356,708 | Goodyear |
| 1,610,553 | Jones |
| 2,522,938 | Francis |
| 2,909,959 | Girden |
| 3,059,519 | Stanton |
| 3,084,687 | Kallmeyer |
| 3,170,979 | Baldwin |
| 3,205,303 | Bradley |

None of the above patent references discloses an information display of the character herein set forth for a diver's face mask.

SUMMARY

According to the present invention, an information display is provided for a diver's face mask which enables the diver to quickly scan status indicators to derive necessary information, and without significant deviation of his eyes from his normal line of sight and visual field of interest. The present information display means comprises a plurality of diver's status indicators mounted to an attachment frame out of the diver's usual line of sight. However, reflecting surfaces are carried by the attachment frame, including a reflecting portion encompassed by the diver's angle of vision, which provide an optical path so that the diver can selectively view his surroundings or the reflected image of the status indicators, in such reflecting portion, as he desires.

The information display means is preferably carried by an attachment frame adapted for detachable mounting to the frame portion of the usual diver's underwater face mask, although the information display means can be made an integral part of such a face mask if desired.

In a preferred embodiment the status indicators are located in the upper portion of the attachment frame, with the reflecting portion visible to the diver located in the lower portion of the attachment frame. Because of the convergence angle of the diver's eyes, his concentration on the field of interest substantially reduces his perception of the image carrying reflective portion located closer to him unless he refocuses his eyes and alters his usual line of sight. Thus, the presence of the reflective portion close to his usual line of sight does not present a significant distraction. Moreover, all of the status indicators are preferably located in a single area on the attachment frame so that the diver experiences no difficulty whatever in quickly determining his situation.

Other objects and features of the invention will become apparent from consideration of the following description taken in connection with the accompanying drawing.

DESCRIPTION OF THE PREFERRED EMBODIMENT

Figure 1:
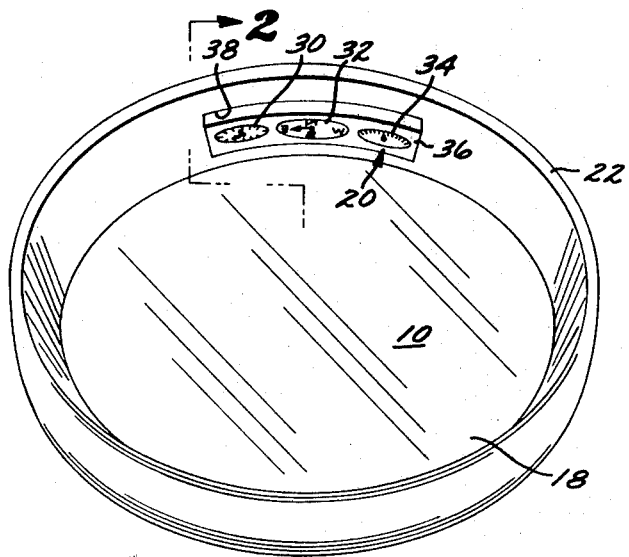
FIG. 1 is a front elevational view of information display means according to the present invention.

Referring now to the drawings, there is illustrated a usual diver's underwater face mask 10 of conventional configuration and including an elliptical frame portion 12 having a rearwardly directed, integrally formed flange 14 made of elastomeric material adapted to provide a watertight seal between the flange 14 and the face of the diver. The mask 10 is held in place by a strap 16 which is worn about the diver's head.

Figure 2:
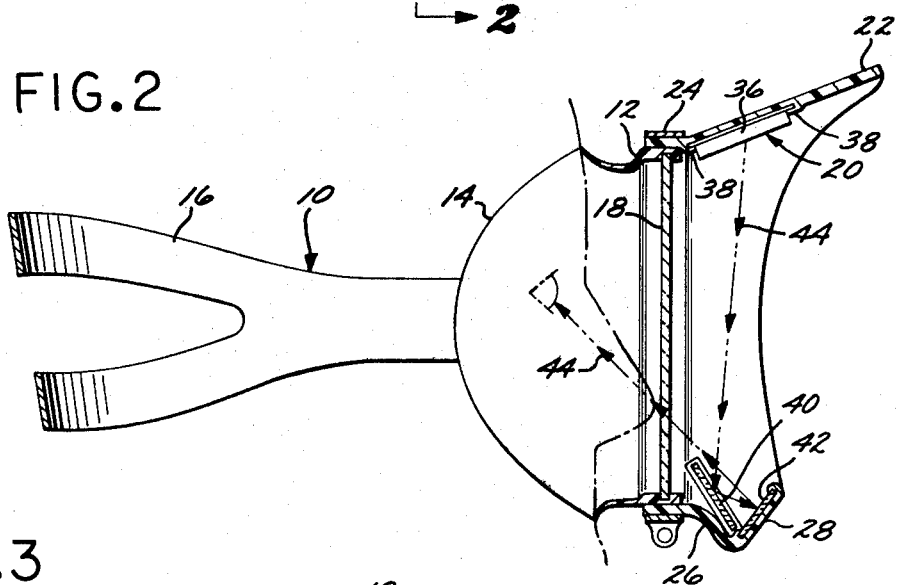
FIG. 2 is a view taken along the line 2—2 of FIG. 1, showing the information display means detachably mounted to a diver's underwater face mask.
Figure 3:
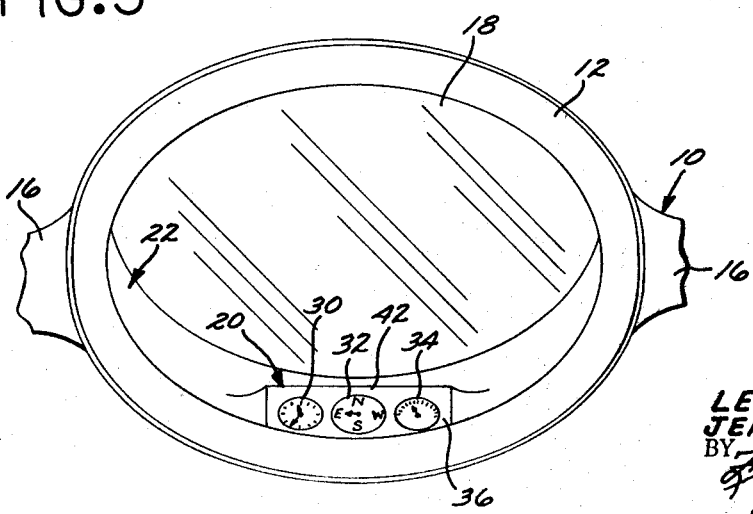
FIG. 3 is a rear elevational view of the information display means.

A face or viewing plate 18 made of a suitable transparent material is mounted to the mask frame portion 12, having its periphery closely fitted within a continuous groove provided in the interior wall of the frame portion 12, as best viewed in FIG. 2. The plate 18 extends in a plane substantially normal to the diver's usual line of sight, which is generally horizontal, as viewed in FIG. 2.

An information display means, generally designated by the numeral 20, is preferably made as a separate attachment which can be mounted to existing face masks, although if desired it could be formed as an integral part of the face mask 10 at the time of manufacture.

The display means 20 comprises, generally, an attachment frame 22 complementally elliptically configured at its rearward portion to telescopably receive the elliptical frame portion 12 of the face mask 10. These interengaged portions are firmly held together by a surrounding band clamp 24 having fasteners (not shown) which are tightened to secure the frame 22 in position upon the face mask.

The attachment frame diverges or flares outwardly at the sides and top to minimize interference with the diver's field of vision. However, the lower portion of the frame 22 dips downwardly and then upwardly in a V-shape configuration to define an inner wall 26 and an outer wall 28. These walls are smoothly faired into the side and top portion of the frame 22, as illustrated.

A plurality of diver status indicators are mounted in the upper portion of the frame 22, including a clock 30 to indicate elapsed dive time, a compass 32 to indicate the directional heading of the diver, and a tank pressure gauge 34 to indicate the amount of air remaining in the air supply tank. As will be seen, it is the reflected image of these indicators that is viewed by the diver. Consequently, the faces of these indicators may have to be altered for this reason. The compass card of the compass 32, for example, is necessarily reversed, as seen in FIG. 1.

The status indicators may be mounted in position in any suitable fashion, such as by an adhesive or the like, but they are preferably screwed or snap fitted into a rectangular mounting body 36 having transverse grooves (not shown) in its front and rearward edges. These grooves receive flanges 38 molded into the upper portion of the attachment frame 22. For this purpose, the frame 22 is made of moldable rubber or plastic material.

A pair of mirrors 40 and 42 defining reflective surfaces are located in general vertical alignment below the status indicators. The mirrors 40 and 42 are located adjacent the walls 26 and 28, respectively, and provide an optical path 44 from the status indicators to the mirrors 40 and 42, and then to the diver.

The mirror 42 is a reflecting portion out of the normal line of sight of the diver, but within his angle or field of vision so that he need only drop his eyes from his normal line of sight to see the image of the status indicators in the mirror 42. Thus, the diver can selectively view either his surroundings or the reflected image of the indicators, as desired.

The mirrors 40 and 42 are held in position by any suitable means, such as by an adhesive, but preferably they are removably wedged in position beneath molded in recesses in the body of the frame 22. There are a pair of recesses for the mirror 40 located in the frame side portions, each of these recesses receiving a side edge of the mirror. The recess for the mirror 42 is formed integral with the frame outer wall 28, as best seen in FIG. 2.

The mirrors 40 and 42 are merely exemplary of one means of providing reflective surfaces. It is also possible to use a prism or the like, or apply a reflective coating directly to a suitable plastic or rubber material used for the walls 26 and 28. However, in the latter case the wall 26 would have to be extended and oriented slightly upwardly to assume a position like that of the mirror 40.

In addition, the positions of the mirrors and the indicators could be reversed, if desired, the status indicators then being located in the lower portion of the face mask, while the mirrors would be in the upper portion of the face mask. However, the preferred arrangement illustrated appears to operate more satisfactory.

It has been found that because of the convergence angle of the diver's eyes, he can scan the field of vision without being significantly distracted by the presence of the reflective portion or mirror 42. The mirror 42 becomes readily apparent only when he focuses his eyes to that distance to read the indicators.

Since the attachment frame 22 is open to the water most of the optical path 44 is through the water, thereby reducing optical distortion sometimes caused by a multiplicity of water to air interfaces.

In summary, the information display means of the present invention provides an underwater mask arrangement incorporating status indicators which can be scanned by the diver without any necessity for reference to independent indicators strapped or fastened to different parts of his body. The detachable manner of mounting of the status indicators enables substitution of different indicators, as desired, and the whole attachment frame may be detached from the face mask if necessary.

Various modifications and changes may be made with regard to the foregoing detailed description without departing from the spirit of the invention.

We claim:

1. The combination of a diver's underwater face mask including a frame portion, and a transparent viewing plate mounted to said frame portion and extending in a plane substantially normal to the diver's usual line of sight; and information display means comprising:

an attachment frame for detachable mounting to said face mask as a forward extension thereof, including mounting means secured to said frame portion of said face mask;

diver status indicators mounted to the upper portion of a peripheral flange of said attachment frame out of said usual line of sight; and at least a pair of reflecting surfaces carried by the lower portion of said flange, a reflective portion of one of said reflecting surfaces being encompassed by the diver's angle of vision but offset from said usual line of sight, said reflecting surfaces providing an optical path sequentially from said reflecting surfaces and thence to said status indicators whereby the diver can selectively view his surroundings or the reflected image of said status indicators.

2. The combination of claim 1 wherein said status indicators include a clock to display the elapsed dive time.

3. The combination of claim 1 wherein said status indicators include a compass in which the compass card is altered to provide a correct reflected image.

4. The combination of claim 1 wherein said attachment frame in use is open to the water whereby a portion of said optical path is through water.

* * * * *